Feb. 28, 1939. W. J. CORLISS 2,149,163
TUBULAR WATER GAUGE SIGHT GLASS
Filed April 8, 1938
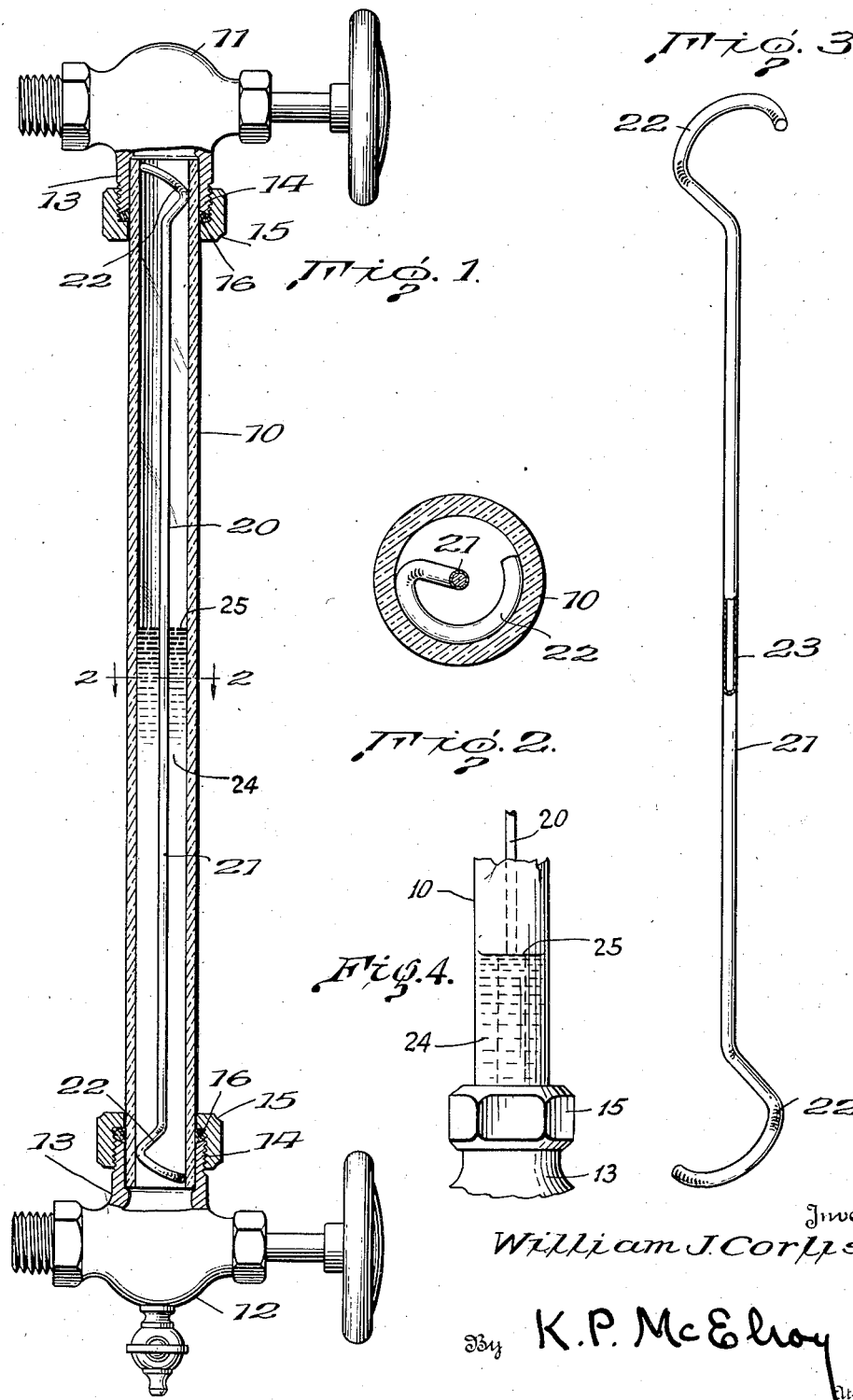
Inventor
William J. Corliss,
By K. P. McElroy
Attorney Patented Feb. 28, 1939

2,149,163

UNITED STATES PATENT OFFICE 2,149,163

TUBULAR WATER GAUGE SIGHT GLASS

William J. Corliss, Dunkirk, N. Y.

Application April 8, 1938, Serial No. 201,005

3 Claims. (Cl. 73—327)

This invention relates to an improvement in tubular water gauge sight glasses; and it consists of a metal wire insert provided with a corrosion resistant surface and adapted to be placed in a plain glass tube such as is ordinarily used for a sight glass, said insert being provided with a relatively long central portion and relatively short spirally bent end portions, said spiral end portions having an outside diameter at least equal to the inside diameter of the tubular sight glass and being adapted to bear upon the inner surface of the glass tube and maintain the central portion of said insert in a fixed vertical position within said tube, so that the water level in said sight glass is more easily read, and difficulties due to bubbles in the sight glass are substantially reduced without substantial restriction of the sight glass openings, all as more fully hereinafter set forth and as claimed.

Various attempts have been made to provide telltale means for tubular water gauges which would improve the visibility of the water level. The means which have been proposed have in general been too complicated and difficult to install or have been too expensive to permit their extended use. Furthermore, in many cases, the means heretofore suggested for this purpose are of such construction as as to materially restrict the opening in the end of the sight glass so that water does not flow freely into and out of the gauge and sediment tends to collect and clog the small openings, and hence their design is in conflict with boiler safety codes, state regulations, etc.

I have now devised an improved telltale insert which is extremely simple and inexpensive in construction, and which may be readily installed in the ordinary form of tubular sight glass used in water level gauges. The telltale of my invention may be inserted in the tubular sight glass without excessive restriction of the openings in the tube, and it will not clog the gauge due to the collecting of sediment. It is so arranged that variations in the spacing of the gauge glass connections do not affect it. Furthermore, it tends to reduce the trapping of air bubbles in the water in the sight glass, and to increase the useful life of the sight glass by reducing sedimentation on the walls of the glass and tending to prevent cracking of the glass under exceptional heat stresses.

In order that my invention and its operation may be more clearly understood, reference is had in the following description to the accompanying drawing, in which—

Fig. 1 represents a side elevation of a water level gauge having a tubular sight glass partially filled with water and provided with the telltale insert of my invention. The fittings are illustrated in partial section to show the position of the spiral ends of the telltale insert.

Fig. 2 is a view in cross-section of the sight glass shown in Fig. 1, on the line 2—2, showing the relation between the spiral ends of the insert and the glass tube.

Fig. 3 is an enlarged view in elevation of the telltale insert of my invention before being placed in the sight glass, showing in partial section the corrosion resistant coating thereon.

Fig. 4 is a fragmentary view in elevation of the lower portion of the gauge of Fig. 1, to show the appearance of the insert in use.

Similar reference numerals are used to indicate similar parts throughout the several figures.

Referring now to the drawing, there is shown in Figure 1 a water gauge having a tubular sight glass member 10 supported between the valve member 11 and a similar valve member 12. Each of the valve members 11 and 12 is provided with a socket portion 13 adapted to receive one end of the tubular sight glass, and having an exterior threaded neck 14. A packing nut 15 and packing 16 is provided to form a tight joint between the tubular sight glass and the fitting. With an arrangement of parts such as this, the sight glass can be readily replaced when broken or fouled by sediment.

Within the tubular sight glass 10 is shown the coated metal wire insert 20 of my invention. This insert comprises an elongated central portion 21 which acts as a telltale and makes reading of the water level in the gauge easier and more accurate; and spiral end portions 22. These spiral end portions bear upon the inner surface of the tubular sight glass 10 as shown in Figure 2 and maintain the central portion 21 in a fixed vertical position in the sight glass without materially restricting the opening in the end.

The insert 20 is formed of metal wire. In general substantially any metal wire may be used which will be sufficiently stiff, when provided with a protective corrosion resistant coating, to permit the spiral portions to bear firmly against the tubular sight glass and maintain the insert in position. The cross section of the wire should not be any greater than necessary to attain the required stiffness, so that the spiral end portions of the insert do not materially restrict the end portions of the sight glass. I have found in many cases that No. 10 copper wire is satisfactory. The outside diameter of the spiral end portion of the insert should be of sufficient diameter to cause the spiral to bear firmly against the inside of the glass tube. For this purpose the outside diameter of the spiral should be at least equal to the inside diameter of the tube in which the insert is designed to be used, and in most cases I prefer to have the spiral slightly larger than the inside of the tube so that a spring action is effected against the tube, and the insert is held firmly in place. The insert with its spiral end portions is contained wholly within the tubular sight glass. Thus it will be seen that the insert is readily replaceable when the sight glass is replaced in the gauge, and is not affected by variations in length of the glass tube replacements. This simplicity of installation is a particular advantage of the telltale insert of my invention.

As shown in Fig. 3, the insert 20 is provided on its surface with a protective corrosion resistant coating 23. This coating may be of any suitable type, such as a waterproof paint, enamel, or varnish coating, or any other form of impervious coating which will prevent contact of the water in the gauge with the metal surface of the wire insert, and thus prevent attack on the metal surface. In general, I have found baked-on enamel coatings to be particularly suitable. Such coatings serve a twofold purpose. They prevent corrosion of the wire insert and they impart substantial stiffness to the wire, thus making it possible in some cases to use a wire of less cross section than would otherwise be desirable. The protective coating is preferably bright colored to increase the visibility of the telltale.

When in operating position in a tubular sight glass, the wire insert serves several functions. The portion of the insert below the water level in the sight glass is substantially magnified and a point of demarcation is plainly visible at the water level, so that the height of the water in the gauge is readily observable. Fig. 4 shows the appearance of the gauge in use. Water fills the tube as indicated at 24, up to some level 25. The portion of the insert 20 below surface 25 appears magnified as shown. There is a sharp line of demarcation between the magnified and the unmagnified portions of the insert. Furthermore, the spiral ends of the insert tend to impart a slight swirling motion to water being admitted to the gauge, which decreases the tendency of air bubbles to be trapped in the gauge. The insert also serves as a heat conductor within the gauge, and tends to equalize temperature differentials on the surface of the glass tube between the bottom and top of the tube, thus minimizing breakage due to sudden temperature changes. Tube end wear is minimized and the gaskets last longer. In a particular installation, certain water gauge glasses required replacement every month in use, but upon incorporating the present invention therein, the replacement interval was extended several fold.

While my invention has been described herein with particular reference to structure and arrangement of parts, it is understood that some changes may be made in the structure and combination of parts described herein, without departing from the scope of my invention as defined in the following claims.

What I claim is:

1. A telltale insert for a tubular sight glass in a water gauge, said insert beng formed of a metal wire provided with a corrosion resistant surface and having an elongated central portion and spirally bent end portions inside the tubular glass and terminating short of the ends of the glass, said spiral end portions having an outside diameter at least substantially equal to the inside diameter of the tubular sight glass and being adapted to bear upon the inside surface of the sight glass in use and maintain said insert in a fixed vertical position within said sight glass.

2. A water level gauge comprising a tubular sight glass, fluid connection means for each end of the glass, and a telltale insert within the tubular glass, formed of a metal wire provided with a corrosion resistant coating and having an elongated central portion and spirally bent end portions terminating short of the fluid connection means and out of contact therewith, said spiral end portions having an outside diameter at least equal to the inside diameter of the tubular sight glass and being adapted to bear upon the inside surface of the sight glass in use and maintain said insert in a fixed vertical position within said sight glass.

3. In a water level gauge having a tubular sight glass and fluid connection means for each end of the glass, a telltale insert within the glass, formed of a metal wire provided with a corrosion-resistant surface and having a straight body portion and bent, hook-shaped portions at each end thereof, frictionally engaging the interior of the glass at spaced points to retain the insert in fixed vertical, central position within the glass, and terminating short of the fluid connection means.

WILLIAM J. CORLISS.